No. 701,190. Patented May 27, 1902.
G. FORBES.
RANGE FINDER.
(Application filed July 8, 1901.)
(No Model.) 2 Sheets—Sheet 1.
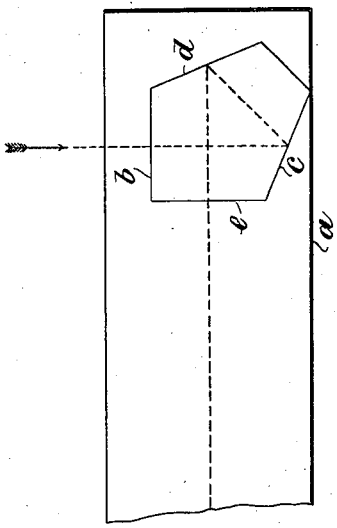
Fig. 1.
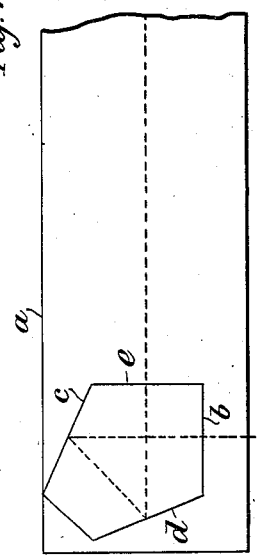
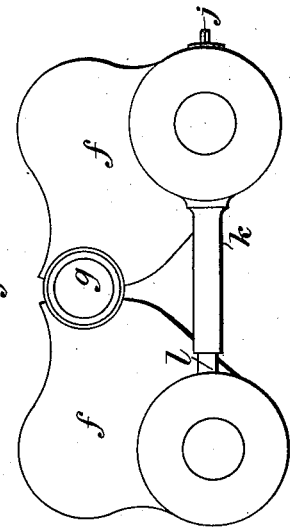
Fig. 3.
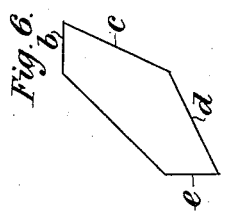
Fig. 6.
Fig. 4. Fig. 5.
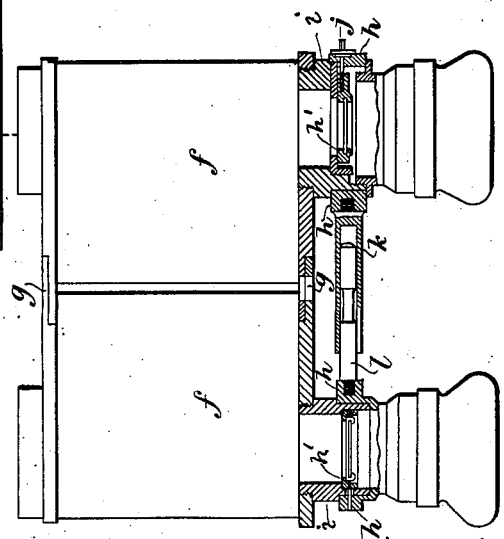
Witnesses.
A. M. Parkins.
J. A. MacDonald.
Inventor.
George Forbes,
By his Attorneys,
Baldwin Davidson & Wight No. 701,190. Patented May 27, 1902.
G. FORBES.
RANGE FINDER.
(Application filed July 8, 1901.)
(No Model.) 2 Sheets—Sheet 2.
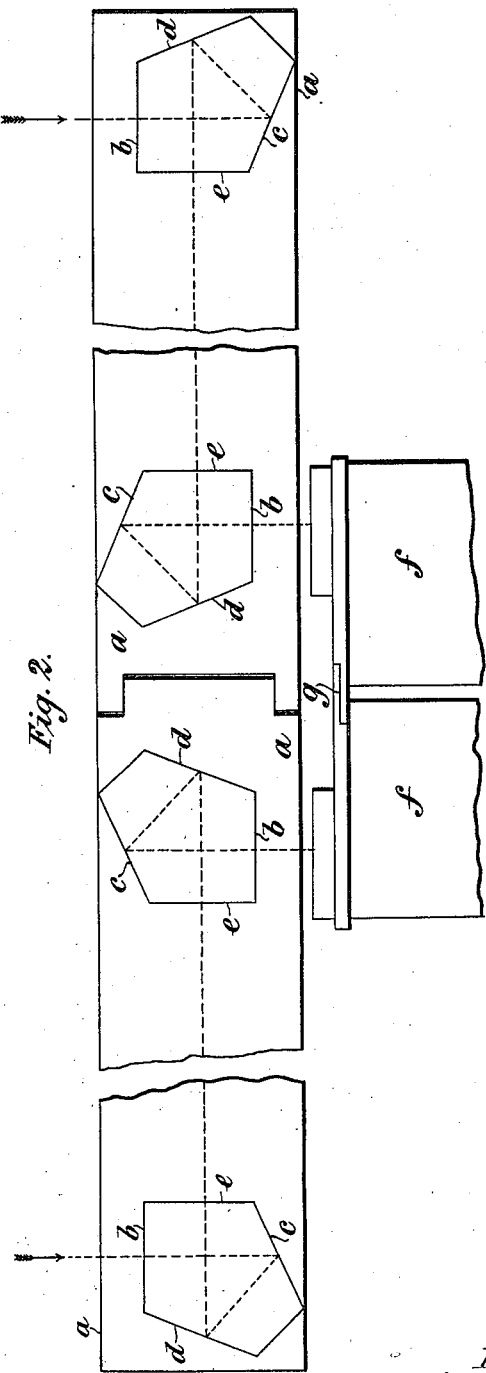

UNITED STATES PATENT OFFICE.

GEORGE FORBES, OF WESTMINSTER, ENGLAND.

RANGE-FINDER.

SPECIFICATION forming part of Letters Patent No. 701,190, dated May 27, 1902.

Application filed July 8, 1901. Serial No. 67,478. (No model.)

*To all whom it may concern:*

Be it known that I, GEORGE FORBES, F.R.S., electrical engineer, a subject of the King of Great Britain, residing at 34 Great George street, Westminster, England, have invented a certain new and useful Range-Finder, of which the following is a specification.

This invention relates to telescopic range-finders in which the object whose distance is to be ascertained is viewed simultaneously with both eyes, one eye seeing it through two prisms at the two ends of the base-line or part of it and by the other eye direct or through a similar arrangement, the base-line in the latter case being the sum of the lengths between the prisms of the two pairs. In arrangements of this sort which have hitherto been constructed one or both of the prisms have formed part of the telescope, the object-glass of which has usually been placed between the prisms, and therefore any slight bending of the tube, such as might result from a blow or even from unequal expansion owing to the sun shining on one side, alters the optical axis of the telescope and causes serious errors in the result. The scales also of such instruments are difficult to maintain in accurate adjustment. Also the whole length of the double tube must be rigid and a hinge or joint in the middle for portability would not be permissible.

The object of this invention is to remedy these defects.

I make the telescope optically distinct from the tube, placing it at the rear of the second prism, and I so select and place the prisms that any slight bending of the tube does not materially affect the parallelism of the entering and emerging rays. I also ascertain the distance of the object by the coincidence of two lines, one in each eyepiece, or by the point of intersection of a line in one eyepiece with a scale in the other at the time when the eyes have been so converged as to make the two images of the object coincident.

Figure 1 is a diagrammatic section of a single arrangement; and Fig. 2 is a similar view of a double arrangement, the two tubes being hinged together. Fig. 3 is a rear elevation of the binocular telescope. Figs. 4 and 5 are diagrammatic views of the scales, and Fig. 6 shows a modified form of prism.

$a$, Fig. 1, is the tube, having two prisms in it. These prisms are similar to one another, each having four operative faces $b\ c\ d\ e$, two— namely, $b$ and $e$—being at right angles to each other, the other two—namely, $c$ and $d$—being at angles of one hundred and twelve and one-half degrees to these, and therefore at forty-five degrees to each other. The prisms are arranged, as shown, with their corresponding faces parallel to each other, but oppositely directed. With two prisms of this form and arranged in this manner if one be turned through a small angle relatively to the other the emerging ray still remains substantially parallel to the entering ray, and this is also the case if both are turned together relatively to the telescope, and it is this fact that renders any slight bending of the tube unimportant and makes the hinged arrangement, Fig. 2, possible. Fig. 6 shows a different form of prism with the same angles between the faces, but having the obtuse angles between $b$ and $d$ and between $c$ and $e$ and the acute angle between $c$ and $d$ outside instead of inside.

$f$ is the binocular telescope, which is of the ordinary internally-reflecting type, the distance between the eyes being adjusted by turning the tubes about the pivots $g$, as is well understood.

In order to enable a filar micrometer to be employed, I adopt the following arrangement:

$h\ h$ are rings free to turn in grooves on the outside of the eyepiece-tubes $i$, and $h'\ h'$ are rings inside the eyepiece-tubes, connected to and turning with the rings $h$, the connections passing through slots in the eyepiece-tubes. The rings $h'\ h'$ carry indicating devices, which may be as follows: Each ring carries a wire, scale, or other mark. These wires or scales may be either parallel to each other or inclined to each other, as shown in Figs. 4 and 5. In the former case the distance is ascertained by shifting one of the wires by turning the micrometer-screw $j$ until the images of the wires coincide, and in the latter arrangement, which I prefer, the distance is ascertained by reading the position of the intersection of the two wires on the scale, Fig. 4, the measurement being taken in each case when the two images of the object coincide.

In each case it is essential that the parallelism or the angle between the wires shall not be affected by the movement of the tubes around the pivots $g$. In order to insure this, one of the rings $h$ has fixed to it a tube $k$, while the other has fixed to it a rod $l$, sliding telescopically in the tube $k$. As shown in Fig. 3, the pivots $g$ are situated in the same plane as the axes of the two tubes $f$, so that any alteration of the distance between the eyepieces practically leaves the distance between the object-glasses unaltered.

What I claim is—

1. In a range-finder, a base member adapted to be used with a telescope, comprising a rigid bar and two similar prisms rigidly fixed to the bar with their corresponding faces parallel to each other but oppositely directed, each prism having four operative faces, two at right angles to each other and the other two equally inclined to the first and inclined at an angle of forty-five degrees to each other.

2. In a range-finder, a base member, adapted to be used with a telescope, comprising a rigid straight tubular bar and two similar prisms rigidly fixed to the bar with their corresponding faces parallel to each other but oppositely directed, each prism having four operative faces, two at right angles to each other and the other two equally inclined to the first and inclined at an angle of forty-five degrees to each other.

3. In a range-finder, a base member comprising a rigid straight tubular bar and two similar prisms rigidly fixed to the bar with their corresponding faces parallel to each other but oppositely directed, each prism having four operative faces, two at right angles to each other and the other two equally inclined to the first and inclined at an angle of forty-five degrees to each other combined with a mechanically separate binocular telescope having indicating devices in the eyepieces.

4. In a range-finder, a base member comprising a rigid straight tubular bar and two similar prisms rigidly fixed to the bar with their corresponding faces parallel to each other but oppositely directed, each prism having four operative faces, two at right angles to each other and the other two equally inclined to the first and inclined at an angle of forty-five degrees to each other, combined with a mechanically separate binocular telescope having loose rings in the eyepieces, indicating devices carried by the rings, means for changing the distance between the tubes, and means for locking the rings against rotation relatively to each other while permitting their distance apart to be varied.

5. In a binocular telescope for a range-finder, the combination of two tubes, a pivot about which the tubes can turn relatively to each other, rings in the eyepieces, indicating devices carried by the rings and a connection between the rings locking them against rotation relatively to each other but allowing their distance apart to be varied.

6. In a binocular telescope for a range-finder, the combination of two tubes, a pivot about which the tubes can turn relatively to each other, rings in the eyepieces, indicating devices carried by the rings, a tube fixed to one ring and a rod working loosely within this tube fixed to the other ring.

7. In a range-finder, the base member comprising two rigid bars, a pivot connecting the bars, four similar prisms two rigidly fixed to each bar with their corresponding faces parallel to each other but oppositely directed each prism having four operative faces two at right angles to each other and the other two equally inclined to the first and inclined at an angle of forty-five degrees to each other.

8. In a range-finder, the base member comprising two rigid bars, a pivot connecting the bars, four similar prisms two rigidly fixed to each bar with their corresponding faces parallel to each other but oppositely directed each prism having four operative faces two at right angles to each other and the other two equally inclined to the first and inclined at an angle of forty-five degrees to each other, combined with a mechanically separate binocular telescope having indicating devices in the eyepieces.

GEORGE FORBES.

Witnesses:
ARTHUR CARPMAEL, Jr.,
HERBERT ARTHUR MARSHALL.